United States Patent
Xiong et al.

(10) Patent No.: US 10,123,391 B1
(45) Date of Patent: Nov. 6, 2018

(54) DIMMER SWITCH AND DIMMER SWITCH SYSTEM WITH SECONDARY SWITCH

(71) Applicant: EATON CORPORATION, Cleveland, OH (US)

(72) Inventors: Tom Xiong, Shanghai (CN); Kevin Zhong, Shanghai (CN); Lin Yang, Shanghai (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/719,068

(22) Filed: Sep. 28, 2017

(51) Int. Cl.
  *H05B 37/02* (2006.01)
  *H01H 9/54* (2006.01)
  *H02M 1/32* (2007.01)
  *H02M 3/26* (2006.01)

(52) U.S. Cl.
  CPC ........... *H05B 37/0209* (2013.01); *H01H 9/54* (2013.01); *H02M 1/32* (2013.01); *H02M 3/26* (2013.01)

(58) Field of Classification Search
  CPC ....... H05B 37/0209; H01H 9/54; H02M 1/32; H02M 3/26
  See application file for complete search history.

(56) References Cited

U.S. PATENT DOCUMENTS

| | | | | |
|---|---|---|---|---|
| 5,650,694 A | * | 7/1997 | Jayaraman | H05B 41/2828 307/157 |
| 2003/0006710 A1 | * | 1/2003 | Black | H02M 5/293 315/138 |
| 2006/0250093 A1 | * | 11/2006 | Kumar | H05B 37/0209 315/209 R |
| 2012/0230073 A1 | * | 9/2012 | Newman, Jr. | H05B 33/0815 363/126 |
| 2017/0117891 A1 | * | 4/2017 | Lohbihler | G08C 17/02 |

* cited by examiner

*Primary Examiner* — Tung X Le
*Assistant Examiner* — Henry Luong
(74) *Attorney, Agent, or Firm* — Eckert Seamans

(57) ABSTRACT

A dimmer switch system electrically connected between a power source and a load includes a primary housing including a primary switch actuatable by a user, a processor structured to change a state of the dimmer switch based on actuation of either the primary switch or the secondary switch, and a secondary switch isolation circuit. The dimmer switch system also includes a secondary housing including a secondary switch actuatable by the user and being electrically connected to the power source. The secondary switch isolation circuit is electrically connected between the secondary switch and the processor, the secondary switch isolation circuit including a transistor electrically coupled between the power source and the processor and being structured to provide impedance between the power source and the processor. The secondary switch isolation circuit is structured to provide a signal to the processor based on a state of the secondary switch.

18 Claims, 6 Drawing Sheets

US 10,123,391 B1

DIMMER SWITCH AND DIMMER SWITCH SYSTEM WITH SECONDARY SWITCH

BACKGROUND

Field

The disclosed concept relates generally to switches, and in particular, to dimmer switches. The disclosed concept also relates to dimmer switch systems including dimmer switches.

Background Information

Dimmer switches provide a dimming function for loads such as lights. Some dimmer switches also provide an on/off switch so that the load can be turned on or off rather than dimming the load. Additional functionality of dimmer switch is desirable. However, providing additional functionality often comes at the cost of additional components and complexity. It would be desirable to provide additional functionality to dimmer switches while minimizing the cost and complexity of components to provide such additional functionality.

Power usage of dimmer switches is also a concern. It would be desirable to minimize the power usage of dimmer switches.

There is thus room for improvement in dimmer switches, and in dimmer switch systems including dimmer switches.

SUMMARY

These needs and others are met by embodiments of the disclosed concept in which a dimmer switch system includes a secondary switch and a dimmer switch with a secondary switch isolation circuit including a transistor structured to provide impedance between a power source and a processor.

In accordance with one aspect of the disclosed concept, a dimmer switch system electrically connected between a power source and a load, the dimmer switch system comprises: a primary housing including: a primary switch actuatable by a user; a processor structured to change a state of the dimmer switch based on actuation of either the primary switch or the secondary switch; and a secondary switch isolation circuit; a secondary housing including: a secondary switch actuatable by the user and being electrically connected to the power source, wherein the secondary switch isolation circuit is electrically connected between the secondary switch and the processor, the secondary switch isolation circuit including a transistor electrically coupled between the power source and the processor and being structured to provide impedance between the power source and the processor, and wherein the secondary switch isolation circuit is structured to provide a signal to the processor based on a state of the secondary switch.

In accordance with another aspect of the disclosed concept, a dimmer switch comprises: a primary switch actuatable by a user; an input structured to be electrically connected to a secondary switch actuatable by the user, the secondary switch being electrically connected to the power source; a processor structured to change a state of the dimmer switch based on actuation of either the primary switch or the secondary switch; and a secondary switch isolation circuit electrically connected between the secondary switch and the processor, the secondary switch isolation circuit including a transistor electrically coupled between the power source and the processor and being structured to provide impedance between the power source and the processor, and wherein the secondary switch isolation circuit is structured to provide a signal to the processor based on a state of the secondary switch.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
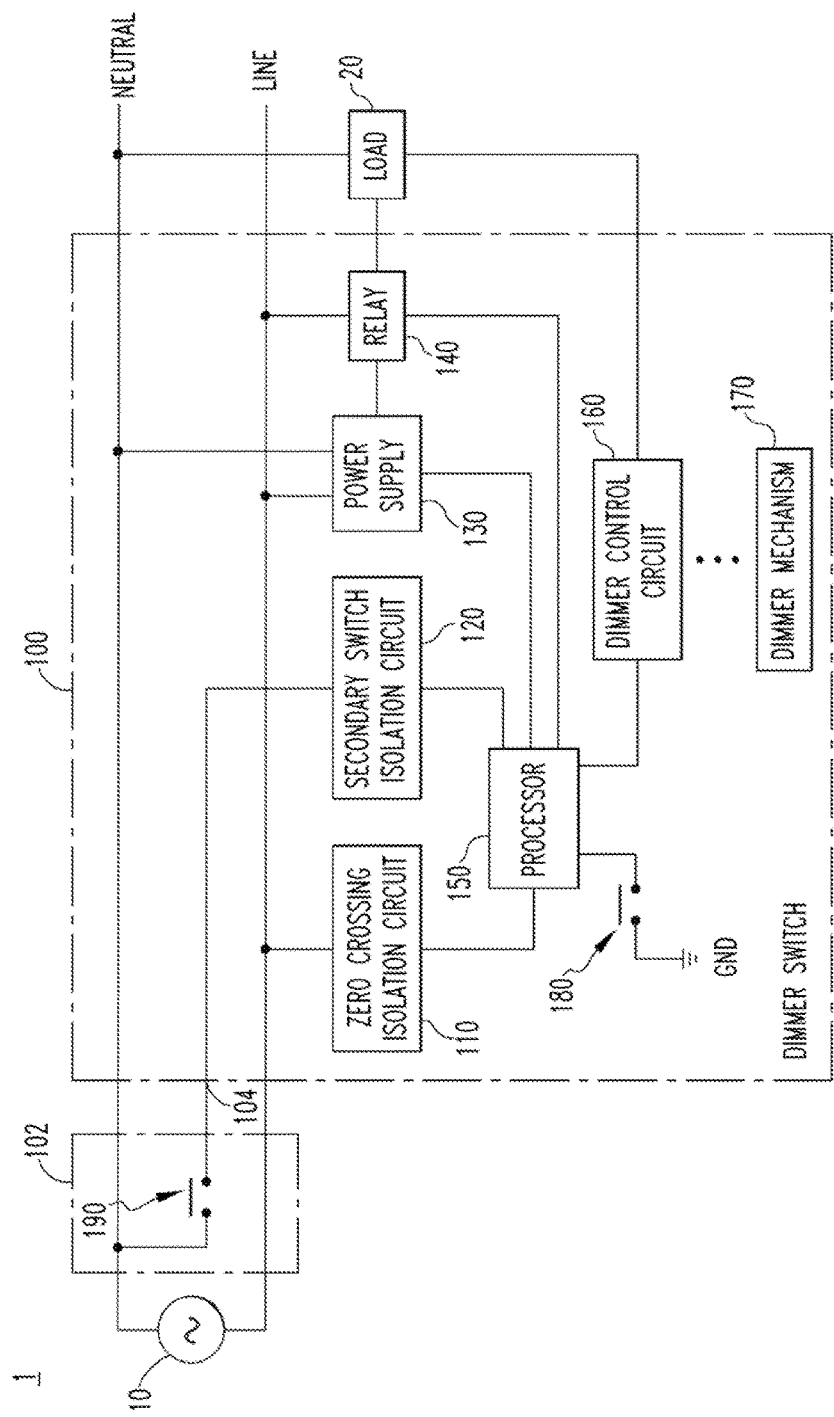
FIG. 1 is a schematic diagram of an electrical system including a dimmer switch system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein. As employed herein, the statement that two or more parts are "coupled" or "connected" together shall mean that the parts are joined together either directly or joined through one or more intermediate parts. As employed herein, the statement that two or more parts are "directly connected" shall mean that the parts are joined together directly with no intermediate parts.

As employed herein, the term "processor" shall mean a programmable analog and/or digital device that can store, retrieve, and process data; a microprocessor; a microcontroller; a microcomputer; a central processing unit; or any suitable processing device or apparatus.

Figure 5:
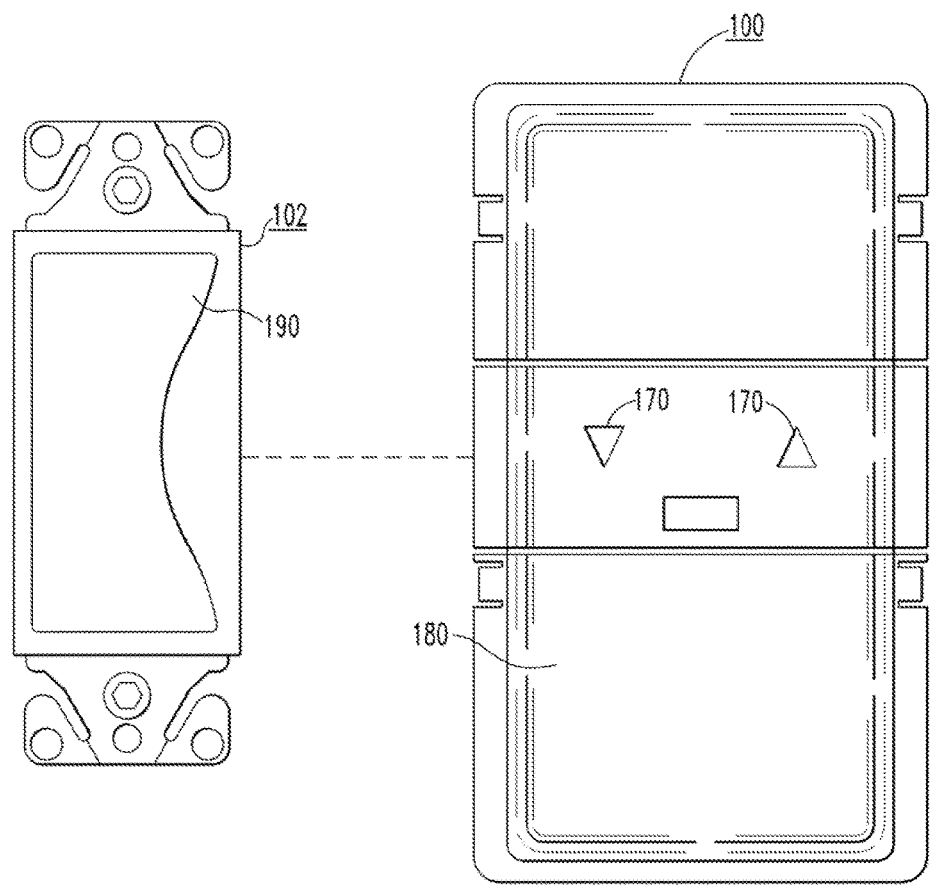
FIG. 5 is an external view of a dimmer switch system in accordance with an example embodiment of the disclosed concept.

FIG. 1 is a schematic diagram of an electrical system 1 including a dimmer switch system in accordance with an example embodiment of the disclosed concept. The dimmer switch system includes dimmer switch 100 and a secondary switch housing 102. The dimmer switch 100 and the secondary switch housing 102 are electrically connected and may be provided in different housings. For example, the components of the dimmer switch 100 may be provided in a primary housing and the secondary switch housing 102 and its components may be a secondary housing. An example is shown in FIG. 5. The dimmer switch 100 and the secondary housing 102 are electrically connected between a power source 10 and a load 20 via line and neutral conductors. In some example embodiments of the disclosed concept, the power source 10 is a 120 Vac or 277 Vac power source. Also, in some example embodiments of the disclosed concept, the load 20 is a dimmable light.

The dimmer switch 100 includes a primary switch 180 and the secondary housing 102 includes a secondary switch 190. Both the primary switch 180 and the secondary switch 190 are actuatable by a user. Actuating the primary switch 180 or the secondary switch 190 causes the dimmer switch to change it state. That is, if the dimmer switch 100 is in the on state (i.e., providing power to the load 20), actuating either of the primary and secondary switches 180,190 will cause the dimmer switch 100 to switch to the off state (i.e., stop providing power to the load 20). Similarly, actuating either of the primary and secondary switches 180,190 when the dimmer switch 100 is in the on state will cause it to change to the off state. The dimmer switch 100 includes a processor 150 that changes the state of the dimmer switch 100 based on actuation of either the primary switch 180 or the secondary switch 190.

The dimmer switch 100 also includes a dimmer mechanism 170. The dimmer mechanism 170 may be operated by a user to control dimming of the load 20. In some example embodiments of the disclosed concept, the dimmer mechanism 170 is a slider. However, it will be appreciated by those having ordinary skill in the art that the dimmer mechanism 170 may take any of several different forms without departing from the scope of the disclosed concept. For example and without limitation, in some example embodiments of the disclosed concept, the dimmer mechanism 170 is a pair of switches that may be operated to increase or lessen dimming.

A relay 140 is included in the dimmer switch 100. The relay 140 is electrically connected between the power source 10 and the load 20. In some example embodiments of the disclosed concept, the relay 140 is electrically connected between a line conductor and the load 20. The relay 140 is able to be electrically controlled to open (i.e., electrically disconnect the load 20 from the power source 10) and to close (i.e., electrically connect the load 20 and the power source 10). Closing the relay 140 corresponds with changing the dimmer switch 100 to the on state and opening the relay 140 corresponds with changing the dimmer switch 100 to the off state.

The dimmer switch 100 also includes the processor 150. The processor 150 is electrically connected to the relay 140 and is structured to electrically control the relay 140 to open and close. The dimmer switch 100 is structured such that when one of the primary and secondary switches 180,190 is actuated, the processor 150 controls the relay 140 to change its state (i.e., change from open to closed or from closed to open).

The dimmer switch 100 further includes a power supply 130. The power supply 130 is electrically connected to the power source 10. The power supply 130 is structured to convert AC power from the power source 10 to DC power usable by the dimmer switch 100. DC power from the power supply 130 may be used to power components of the dimmer switch 100 such as, without limitation, the processor 150, the relay 140, and other components.

A dimmer control circuit 160 is also included in the dimmer switch 100. The dimmer control circuit 160 is electrically connected to the load 20 and is structured to provide the dimming function. The dimmer control circuit 160 provides the dimming function based on the operation of the dimmer mechanism 170 by the user. That is, when the user actuates the dimmer mechanism 170 to dim the load, the dimmer control circuit 160 implements the dimming function in accordance with the user's input. The primary switch 180 is electrically connected between an input of the processor 150 and ground GND. Closing the primary switch 180 pulls the input of the processor 150 to ground GND. The processor 150 is structured to change the state of the dimmer switch 100 (i.e., from on to off or off to on) based on actuation of the primary switch 180.

One end of the secondary switch 190 is electrically connected to the neutral conductor and the other end of the secondary switch 190 is electrically connected to a secondary switch isolation circuit 120. In some example embodiments of the disclosed concept, the dimmer switch 100 includes an input 104 to which the secondary switch 190 may be electrically connected. An electrical connection between the input 104 and the secondary switch isolation circuit 120 would then complete the electrical connection between the secondary switch 190 and the secondary switch isolation circuit 120. The power carried on the neutral conductor is power from the power source 10 and is not suitable for input to the processor 150. The secondary switch isolation circuit 120 includes a transistor electrically coupled between the power source 10 and the processor 150 and is structured to provide impedance between the power source 10 and the processor 150, which protects the processor 150 from the power supplied by the power source 10. The secondary switch isolation circuit 120 is also structured to output a signal to the processor 150 based on the state of the secondary switch 190.

Figure 6:
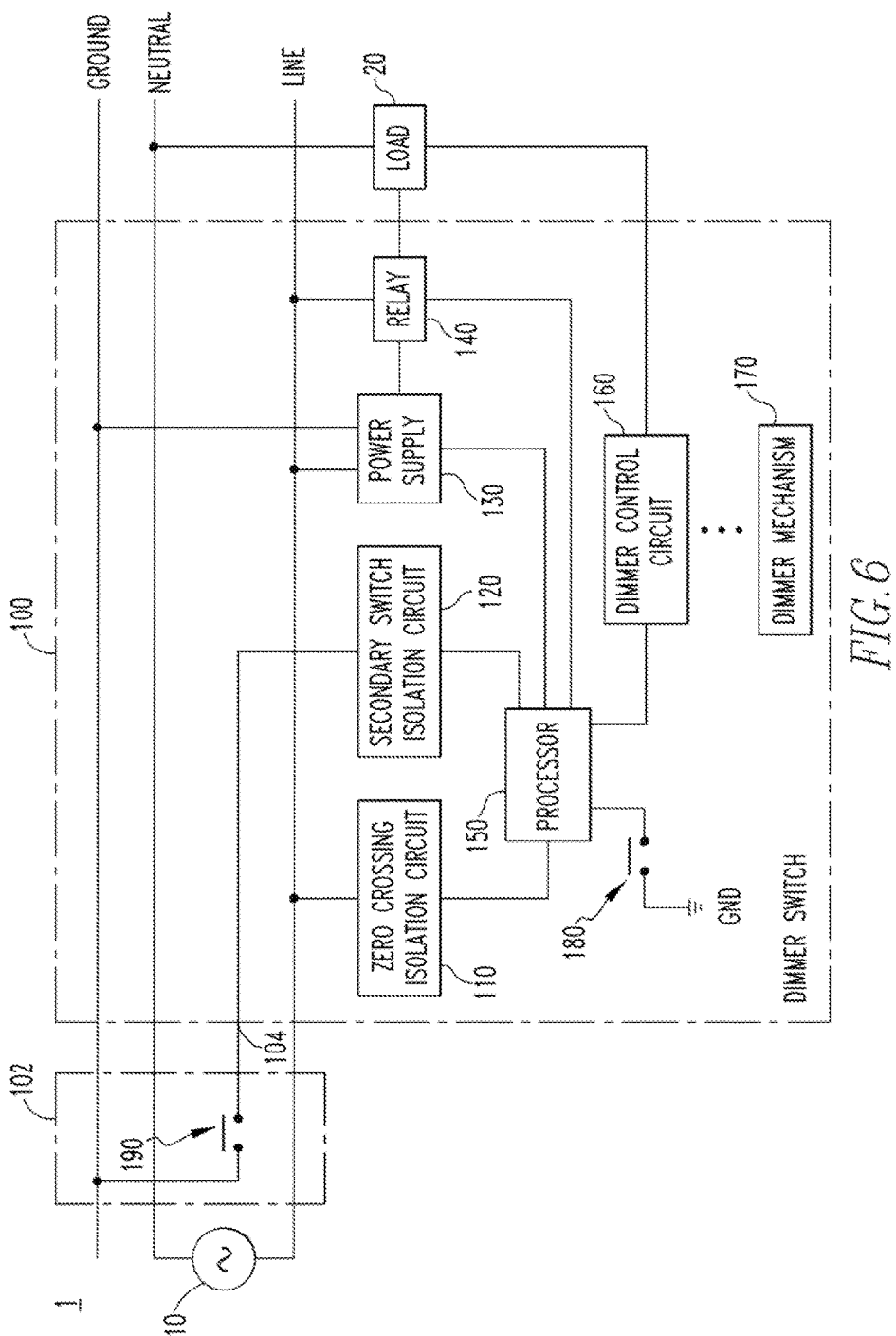
FIG. 6 is a schematic diagram of an electrical system including a dimmer switch system in accordance with an example embodiment of the disclosed concept.

In some example embodiments of the disclosed concept, such as that shown in FIG. 1, the secondary switch 190 and the power supply 130 are electrically connected to a NEUTRAL conductor. The NEUTRAL conductor is also electrically connected to the load. FIG. 6 is a schematic diagram of the electrical system 1 in accordance with another example embodiment of the disclosed concept. The embodiment shown in FIG. 6 is similar to the embodiment shown in FIG. 1. However, in the embodiment shown in FIG. 6, the secondary switch 190 and the power supply 130 are electrically connected to a GROUND conductor rather than the NEUTRAL conductor. The NEUTRAL conductor remains electrically connected to the load 20. In some example embodiments of the disclosed concept, the power supply 130 draws less than 4 mA of power, so electrically connected the power supply 130 to the GROUND conductor will not cause ground fault circuit interrupters protecting the circuit to trip. It will be appreciated by those having ordinary skill in the art that the GROUND conductor is a utility ground, and not a signal ground.

Figure 2:
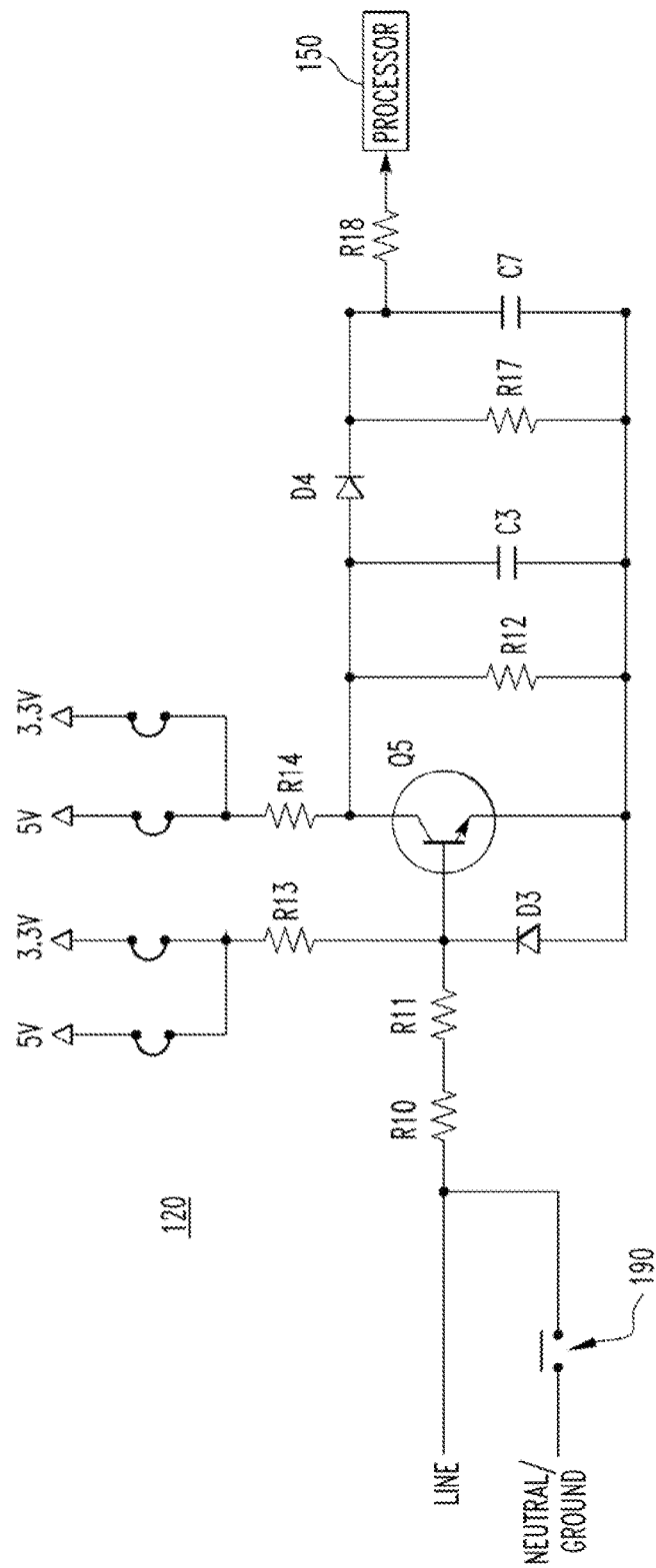
FIG. 2 is a circuit diagram of a secondary switch isolation circuit in accordance with an example embodiment of the disclosed concept.

A circuit diagram of the secondary switch isolation circuit 120 in accordance with an example embodiment of the disclosed concept is shown in FIG. 2. In the circuit diagram of FIG. 2, LINE, NEUTRAL, and GROUND represent line, neutral, and ground conductors. The LINE and NEUTRAL conductors are electrically connected to the power source 10 and the GROUND is a ground used in conjunction with the power source 10. The term NEUTRAL/GROUND used in FIG. 2 denotes that the electrical connection may be made to NEUTRAL or to GROUND. For example, in some embodiments of the disclosed concept, the secondary switch 190 is electrically connected to NEUTRAL and in some other embodiments of the disclosed concept, the secondary switch 190 is electrically connected to GROUND.

As shown in FIG. 2, the secondary switch isolation circuit 120 includes a transistor Q5 electrically coupled between the power source 10 and the processor 150. The transistor Q5 provides impedance between the power source 10 and the processor 150, which provides protection for the processor 150. The transistor Q5 includes a base, a collector, and an emitter. In some example embodiments of the disclosed concept, the transistor Q5 is a bipolar junction transistor.

However, it will be appreciated by those having ordinary skill in the art that other types of transistors may be employed without departing from the scope of the disclosed concept. The base of the transistor is electrically coupled to the power source 10 via the LINE conductor. Intermediate components such as resistors R10,R11 may also be electrically coupled between the power source 10 and the base of the transistor Q5. The collector of the transistor Q5 is electrically coupled to the processor 150. Intermediate component such as diode D4 may also be electrically coupled between the collector of the transistor Q5 and the processor 150.

In some example embodiments, resistor R10 has a high resistances, which limits the amount of current provided to the base of the transistor Q5 from the power source 10. In some example embodiments of the disclosed concept, resistor R10 has about the following resistance: R10 (4000$k\Omega$). However, it will be appreciated by those having ordinary skill in the art that other resistances may be selected without departing from the scope of the disclosed concept.

The secondary switch 190 is electrically coupled between the NEUTRAL conductor and a base of the transistor Q5. Actuating the secondary switch 190 causes the transistor Q5 to turn on and turn off. The secondary switch isolation circuit 120 is structured such that it outputs a signal to the processor 150 when the transistor Q5 turns on.

The secondary switch isolation circuit 120 includes diode D4 electrically coupled between the collector of the transistor Q5 and the processor 150. Resistor R12 and capacitor C3 are electrically connected in parallel between the collector and emitter of the transistor Q5. Diode D3 is electrically connected between the base and emitter of the transistor Q5. Resistor R17 and capacitor C7 are electrically connected in parallel between diode D4 and the emitter of the transistor Q5. Resistor R18 is electrically coupled between diode D4 and the processor 150. Resistor R13 is electrically coupled between one or more supply voltages (e.g., without limitation, 3.3V or 5V) and the base of the transistor Q5. Resistor R14 is electrically coupled between one or more supply voltages (e.g., without limitation, 3.3V or 5V) and the collector of the transistor Q5. In some example embodiments of the disclosed concept, diodes D3 and D4 may provide protection such as protection from reverse current flow.

While FIG. 2 illustrates one example embodiment of the secondary switch isolation circuit 120, it will be appreciated by those having ordinary skill in the art that the disclosed concept is not limited thereto. Different circuit components and arrangements of circuit components may be employed in the secondary switch isolation circuit 120 without departing from the scope of the disclosed concept.

In accordance with some example embodiments of the disclosed concept, the secondary switch isolation circuit 120 provides an impedance (e.g., by use of a transistor) between the power source 10 and the processor 150. The secondary switch isolation circuit 120 also outputs a signal to the processor 150 based on the state of the secondary switch 190. The processor 150 may, for example and without limitation, turn on or turn off a load (e.g., without limitation, a dimmable light) associated with the dimmer switch 100 in response to receiving the signal from the secondary switch isolation circuit 120.

Figure 3:
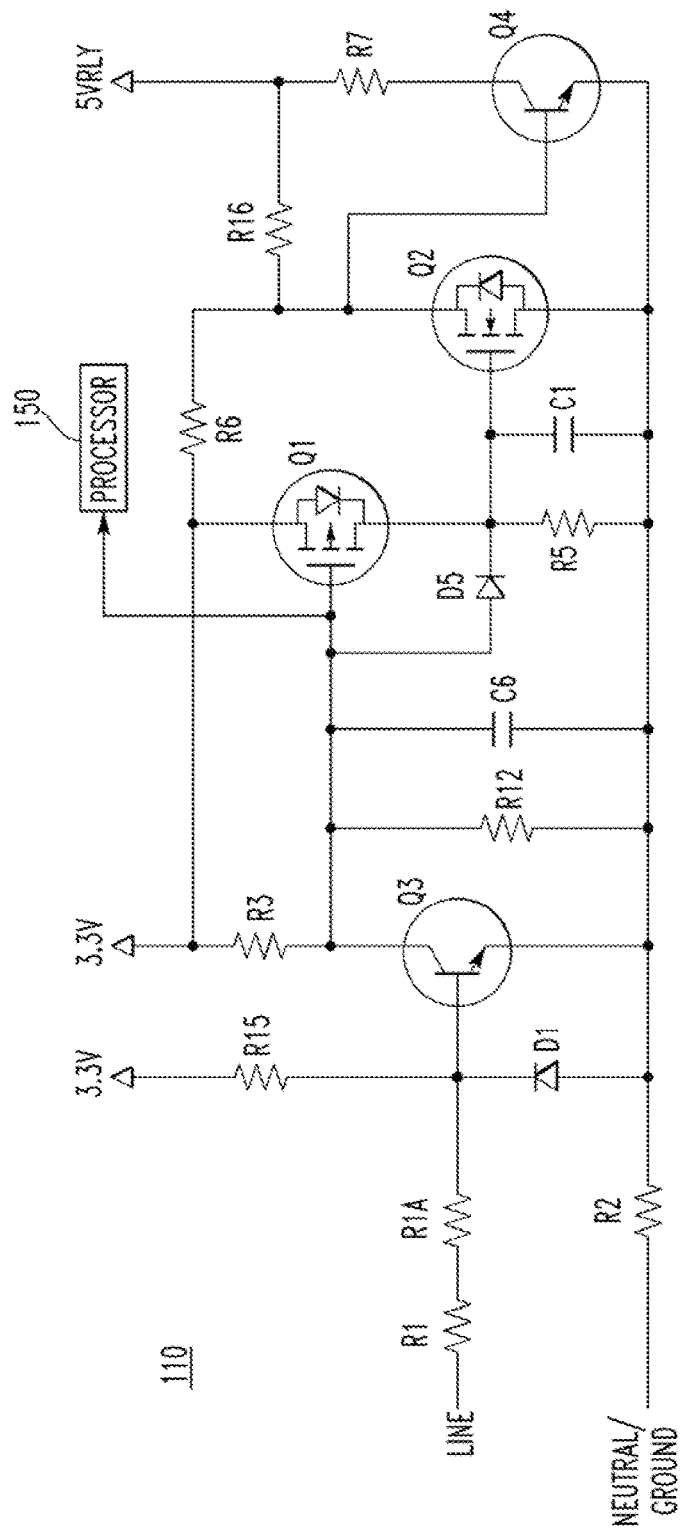
FIG. 3 is a circuit diagram of a zero crossing isolation circuit in accordance with an example embodiment of the disclosed concept.

FIG. 3 is a circuit diagram of the zero crossing isolation circuit 110 in accordance with an example embodiment of the disclosed concept. In the circuit diagram of FIG. 3, LINE, NEUTRAL, and GROUND represent line, neutral, and ground conductors. The LINE and NEUTRAL conductors are electrically connected to the power source 10 and the GROUND is a ground used in conjunction with the power source 10. The term NEUTRAL/GROUND used in FIG. 3 denotes that the electrical connection may be made to NEUTRAL or to GROUND. For example, in some embodiments of the disclosed concept, an input of the resistor R2 is electrically connected to NEUTRAL and in some other embodiments of the disclosed concept, resistor R2 is electrically connected to GROUND.

As shown in FIG. 3, the zero crossing isolation circuit 110 includes a transistor Q3 electrically coupled between the power source 10 and the processor 150. The transistor Q3 provides impedance between the power source 10 and the processor 150, which provides protection for the processor 150. The transistor Q3 includes a base, a collector, and an emitter. In some example embodiments of the disclosed concept, the transistor Q3 is a bipolar junction transistor. However, it will be appreciated by those having ordinary skill in the art that other types of transistors may be employed without departing from the scope of the disclosed concept. The base of the transistor Q3 is electrically coupled to the power source 10 via the LINE conductor. Intermediate components such as resistors R1,R1A may also be electrically coupled between the power source 10 and the base of the transistor Q3. The collector of the transistor Q3 is electrically coupled to the processor 150.

In some example embodiments, resistors R1,R1A,R2 have high resistances, which limits the amount of current provided to the base of the transistor Q3 from the power source 10. In some example embodiments of the disclosed concept, resistors R1,R1A,R2 have about the following resistances: R1 (5100 k$\Omega$); R1A (5100 k$\Omega$); R2 (1000 k$\Omega$). However, it will be appreciated by those having ordinary skill in the art that other resistances may be selected without departing from the scope of the disclosed concept.

Diode D1 is electrically connected between the base and emitter of the transistor Q3. Diode D1 half-wave rectifies the input to the base of the transistor Q3, resulting in the transistor Q3 turning on during positive half-cycles of the power from the power source 10 and turning off during negative half-cycles of the power from the power source. The collector of the transistor Q3 is also electrically coupled to a supply voltage (e.g., without limitation, 3.3V) via resistor R3. This causes the a supply voltage to be output to the processor 150 during positive half-cycles. The processor 150 is capable of detecting zero crossings in the power from the power source 10 based on the voltage at the collector of the transistor Q3.

The zero crossing isolation circuit 110 also includes resistor R15 electrically coupled between a supply voltage (e.g., without limitation, 3.3V) and the base of the transistor Q3. Resistor R4 and capacitor C6 electrically connected in parallel between the collector and emitter of the transistor Q3. Transistor Q1, which is a metal-oxide-semiconductor field-effect-transistor (MOSFET) having a gate electrically coupled to the processor 150 and diode D5 electrically connected between its gate and drain. Transistor Q2, which is a MOSFET having resistor R5 and capacitor C1 electrically connected in parallel between its gate and the emitter of transistor Q3. Transistor Q4, which is a bipolar junction transistor having its base electrically connected to the drain of transistor Q2. Resistor R6 electrically coupled between the source of transistor Q1 and the drain of transistor Q2. Resistor R16 electrically coupled between the drain of transistor Q2 and a supply voltage (e.g., without limitation, 5V). Resistor R7 electrically coupled between a supply voltage (e.g., without limitation, 5V) and a collector of transistor Q4.

While FIG. 3 illustrates one example embodiment of the zero crossing isolation circuit 110, it will be appreciated by those having ordinary skill in the art that the disclosed concept is not limited thereto. Different circuit components and arrangements of circuit components may be employed in the zero crossing isolation circuit 110 without departing from the scope of the disclosed concept.

The zero crossing isolation circuit 110 provides impedance between the power source 10 and the processor 150. The zero crossing isolation circuit 110 also outputs a zero crossing signal to the processor 150 based on power received from the power source 10. The zero crossing signal is usable by the processor 110 to detect zero crossings in the power from the power source 110. For example and without limitation, the zero crossing signal is 5V or less signal that appears only during positive half-cycles of the power from the power source 10, which is a signal that is usable by the processor 150 to detect zero crossings in the power from the power source 10. In contrast, the power from the power source 10 may reach voltages that are too high (e.g., without limitation, 120 Vac) to be usable by the processor 150.

Figure 4:
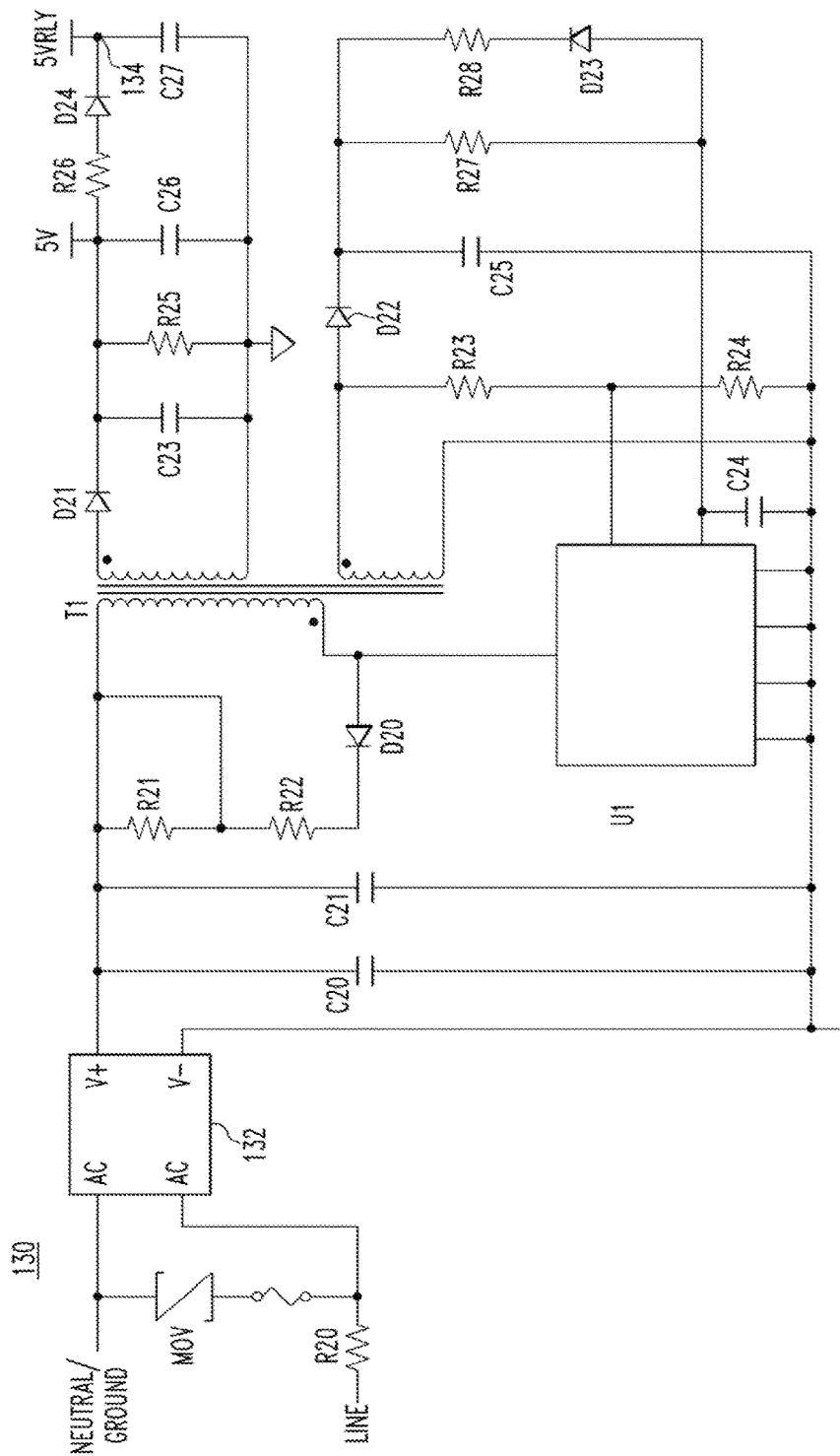
FIG. 4 is a circuit diagram of a power supply in accordance with an example embodiment of the disclosed concept.

FIG. 4 is a circuit diagram of the power supply 130 in accordance with an example embodiment of the disclosed concept. In the circuit diagram of FIG. 4, LINE, NEUTRAL, and GROUND represent line, neutral, and ground conductors. The LINE and NEUTRAL conductors are electrically connected to the power source 10 and the GROUND is a ground used in conjunction with the power source 10. The term NEUTRAL/GROUND used in FIG. 4 denotes that the electrical connection may be made to NEUTRAL or to GROUND. For example, in some embodiments of the disclosed concept, an AC/DC converter 132 is electrically connected to NEUTRAL and in some other embodiments of the disclosed concept, the AC/DC converter 132 is electrically connected to GROUND.

The power supply includes resistor R20 electrically coupled between the power source 10 and an AC/DC converter 132 via the LINE conductor. The AC/DC converter 132 is structured to convert AC power from the power source 10 to DC power. The power supply 130 is structured to limit the current it draws from the power source 10. In some example embodiments of the disclosed concept, the power supply 130 is structured to limit the power it draws from the power source 10 to less than 5 mA of current. Resistor R20 limits the current drawn by the power supply 130 from the power source 10. In some example embodiments the power source 10 has a voltage of 120 Vac and the resistor R20 has a resistance of about 39 kΩ, which results in a current of about no higher than 3 mA. However, it will be appreciated by those having ordinary skill in the art, that the resistance of resistor R20 may be selected to achieve the desired maximum current drawn by the power supply 130 and/or to account for different voltages of the power provided by the power source 10.

The power supply 10 further includes a metal oxide varistor (MOV) electrically coupled to the LINE and NEUTRAL conductors between the power source 10 and the AC/DC converter 132. The MOV provides surge protection for the power supply 130.

The power supply 130 is structured to provide supply voltages (e.g., without limitation, 3.3V, 5V, SVRLY) for use by components of the dimmer switch 100 such as the zero crossing isolation circuit 110 and the secondary switch isolation circuit 120. The power supply 130 is structured to provide at least some of the supply voltages (e.g., SVRLY) in a stable manner that does not drop during zero crossings of power provided from the power source 10. To this end, the power supply includes an output 134 where the stable supply voltage is provided. Shottky diode D24 and capacitor C27 are electrically coupled to the output 134. Shottky diode D24 and capacitor C27 facilitate the stable supply voltage that does not drop during zero crossings of the power provided by the power source 10.

The power supply 130 includes various additional components in a DC/DC converter arrangement electrically connected to output of the AC/DC converter 132. Capacitors C20 and C21 are electrically connected in parallel between outputs of the AC/DC converter 132. Resistor R21 and capacitor C22 are electrically connected in parallel to an output of the AC/DC converter 132, and are in turn electrically connected in series with resistor R22 and diode D20. Diode D21 is electrically connected to one tap of transformer T1. Resistor R25 and capacitors C23 and C26 are electrically connected in parallel with each other. Resistor R26 is electrically connected to Shottky diode D24. Integrated circuit U1 is a flyback converter. Resistors R23,R24, R27,R28, capacitors C24,C25, and diodes D22,D23 are electrically coupled to a second secondary tap of transformer T1.

While FIG. 4 illustrates one example embodiment of the power supply 130, it will be appreciated by those having ordinary skill in the art that the disclosed concept is not limited thereto. Different circuit components and arrangements of circuit components may be employed in the power supply 130 without departing from the scope of the disclosed concept.

Referring to FIG. 5, an external view of the dimmer switch system including the dimmer switch 100 and the secondary switch housing 102 in accordance with an example embodiment of the disclosed concept is shown. As is shown in FIG. 5, the dimmer switch 100 has its own primary housing and the secondary housing 102 is a separate housing. In some example embodiments of the disclosed concept, the primary housing includes the primary switch 180, the processor 150, the secondary switch isolation circuit 120, and other components of the dimmer switch 100 while the secondary housing 102 includes the secondary switch 190.

The dimmer switch 100 in accordance with some example embodiments of the disclosed concept provides the additional functionality of being able to receive input from the secondary switch 190. The secondary switch 190 can be easily provided as an add-on to the dimmer switch 100. Similarly, in some example embodiments of the disclosed concept, the zero-crossing isolation circuit 110 provides the additional functionality of a zero-crossing signal usable by the processor 150 while protecting the processor 150 from the power source 10. The zero-crossing isolation circuit 110 can, thus, also be easily provided as a modification to an existing dimmer switch. Furthermore, the power supply 130 limits the power it draws and provides a stable supply voltage that is not susceptible to dropping during zero crossings of the power provided by the power source 10.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A dimmer switch system electrically connected between a power source and a load, the dimmer switch system comprising:
   a primary housing including:
      a primary switch actuatable by a user;
      a processor structured to change a state of a dimmer switch based on actuation of either the primary switch or a secondary switch; and
      a secondary switch isolation circuit;
   a secondary housing including:
      the secondary switch, wherein the secondary switch is actuatable by the user and electrically connected to the power source,
   wherein the secondary switch isolation circuit is electrically connected between the secondary switch and the processor, the secondary switch isolation circuit including a transistor electrically coupled between the power source and the processor and being structured to provide impedance between the power source and the processor,
   wherein the secondary switch isolation circuit is structured to provide a signal to the processor based on a state of the secondary switch,
   wherein the transistor is a bipolar junction transistor including a base, a collector, and an emitter,
   wherein the power source is electrically coupled to the base of the transistor; and wherein the processor is electrically coupled to the collector of the transistor, and
   wherein the secondary switch isolation circuit includes a diode coupled between the collector of the transistor and the processor.

2. The dimmer switch system of claim 1, wherein the secondary switch is electrically coupled between the power source and the transistor; and wherein actuating the secondary switch causes the transistor to turn on and turn off.

3. The dimmer switch system of claim 1, further comprising:
   a zero-crossing isolation circuit including a second transistor electrically coupled between the power source and the processor and being structured to provide impedance between the power source and the processor,
   wherein the zero-crossing isolation circuit is structured to provide a zero-crossing signal to the processor based on power received from the power source.

4. The dimmer switch system of claim 3, wherein the second transistor includes a base, a collector, and an emitter; wherein the power source is electrically coupled to the base of the second transistor; and wherein the processor is electrically coupled to the collector of the second transistor.

5. The dimmer switch system of claim 1, further comprising:
   a power supply structured to convert alternating current power from the power source to direct current power.

6. The dimmer switch system of claim 5, wherein the power supply is structured to draw less than 0.5 mA of current from the power source.

7. The dimmer switch system of claim 6, wherein the power supply includes an AC/DC converter and a resistor electrically connected between the power source and the AC/DC converter.

8. The dimmer switch system of claim 7, wherein the alternating current power provided by the power source has a voltage of 120 Vac and the resistor has a resistance of about 39 kΩ.

9. The dimmer switch system of claim 7, wherein the power supply includes a metal oxide varistor (MOV) electrically coupled between the power source and the AC/DC converter; and wherein the MOV is structured to provide surge protection.

10. The dimmer switch system of claim 5, wherein the power supply includes an output where the direct current power is output and is structured such that the direct current power does not drop in voltage during a zero-crossing of the alternating current power.

11. The dimmer switch system of claim 10, wherein the power supply includes a Shottky diode and a capacitor electrically coupled to the output where the direct current power is output.

12. The dimmer switch system of claim 1, further comprising:
   a relay electrically connected between the power source and the load,
   wherein the processor is structured electrically control the relay to open and close, and
   wherein electrically controlling the relay to close changes the state of the dimmer switch to an on state and electrically controlling the relay to open changes the state of the dimmer switch to an off state.

13. The dimmer switch system of claim 1, further comprising:
   a dimmer mechanism operable by the user; and
   a dimmer control circuit structured to provide a dimming function based on operation of the dimmer mechanism.

14. A dimmer switch system electrically connected between a power source and a load, the dimmer switch system comprising:
   a primary housing including:
      a primary switch actuatable by a user;
      a processor structured to change a state of a dimmer switch based on actuation of either the primary switch or a secondary switch; and
      a secondary switch isolation circuit;
   a secondary housing including:
      the secondary switch, wherein the secondary switch is actuatable by the user and electrically connected to the power source,
   wherein the secondary switch isolation circuit is electrically connected between the secondary switch and the processor, the secondary switch isolation circuit including a transistor electrically coupled between the power source and the processor and being structured to provide impedance between the power source and the processor,
   wherein the secondary switch isolation circuit is structured to provide a signal to the processor based on a state of the secondary switch,
   wherein the transistor is a bipolar junction transistor including a base, a collector, and an emitter,
   wherein the power source is electrically coupled to the base of the transistor; and wherein the processor is electrically coupled to the collector of the transistor, and
   wherein the secondary switch isolation circuit includes a diode coupled between the base and the emitter of the transistor.

15. A dimmer switch comprising:
   a primary switch actuatable by a user;

an input structured to be electrically connected to a secondary switch actuatable by the user, the secondary switch being electrically connected to a power source;

a processor structured to change a state of the dimmer switch based on actuation of either the primary switch or the secondary switch; and a secondary switch isolation circuit electrically connected between the secondary switch and the processor, the secondary switch isolation circuit including a transistor electrically coupled between the power source and the processor and being structured to provide impedance between the power source and the processor, wherein the secondary switch isolation circuit is structured to provide a signal to the processor based on a state of the secondary switch, wherein the transistor is a bipolar junction transistor including a base, a collector, and an emitter, wherein the power source is electrically coupled to the base of the transistor; and wherein the processor is electrically coupled to the collector of the transistor, and wherein the secondary switch isolation circuit includes a diode coupled between the collector of the transistor and the processor.

16. The dimmer switch of claim 15, wherein the secondary switch is electrically coupled between the power source and the transistor; and wherein actuating the secondary switch causes the transistor to turn on and turn off.

17. The dimmer switch of claim 15, further comprising:
a zero-crossing isolation circuit including a second transistor electrically coupled between the power source and the processor and being structured to provide impedance between the power source and the processor, wherein the zero-crossing isolation circuit is structured to provide a zero-crossing signal to the processor based on power received from the power source.

18. A dimmer switch comprising:
a primary switch actuatable by a user;

an input structured to be electrically connected to a secondary switch actuatable by the user, the secondary switch being electrically connected to a power source;

a processor structured to change a state of the dimmer switch based on actuation of either the primary switch or the secondary switch; and a secondary switch isolation circuit electrically connected between the secondary switch and the processor, the secondary switch isolation circuit including a transistor electrically coupled between the power source and the processor and being structured to provide impedance between the power source and the processor, wherein the secondary switch isolation circuit is structured to provide a signal to the processor based on a state of the secondary switch, wherein the transistor is a bipolar junction transistor including a base, a collector, and an emitter, wherein the power source is electrically coupled to the base of the transistor; and wherein the processor is electrically coupled to the collector of the transistor, and wherein the secondary switch isolation circuit includes a diode coupled between the base and the emitter of the transistor.

* * * * *